No. 689,111. Patented Dec. 17, 1901.
R. F. McKAIG.
HAY OR STRAW BALING MACHINE.
(Application filed June 1, 1901.)
(No Model.) 5 Sheets—Sheet 1.

WITNESSES:

INVENTOR
Richard F. McKaig.
BY
ATTORNEYS

No. 689,111. Patented Dec. 17, 1901.
R. F. McKAIG.
HAY OR STRAW BALING MACHINE.
(Application filed June 1, 1901.)
(No Model.) 5 Sheets—Sheet 2.

WITNESSES:

INVENTOR
Richard F. McKaig
BY
ATTORNEYS

No. 689,111. Patented Dec. 17, 1901.
R. F. McKAIG.
HAY OR STRAW BALING MACHINE.
(Application filed June 1, 1901.)
(No Model.) 5 Sheets—Sheet 3.
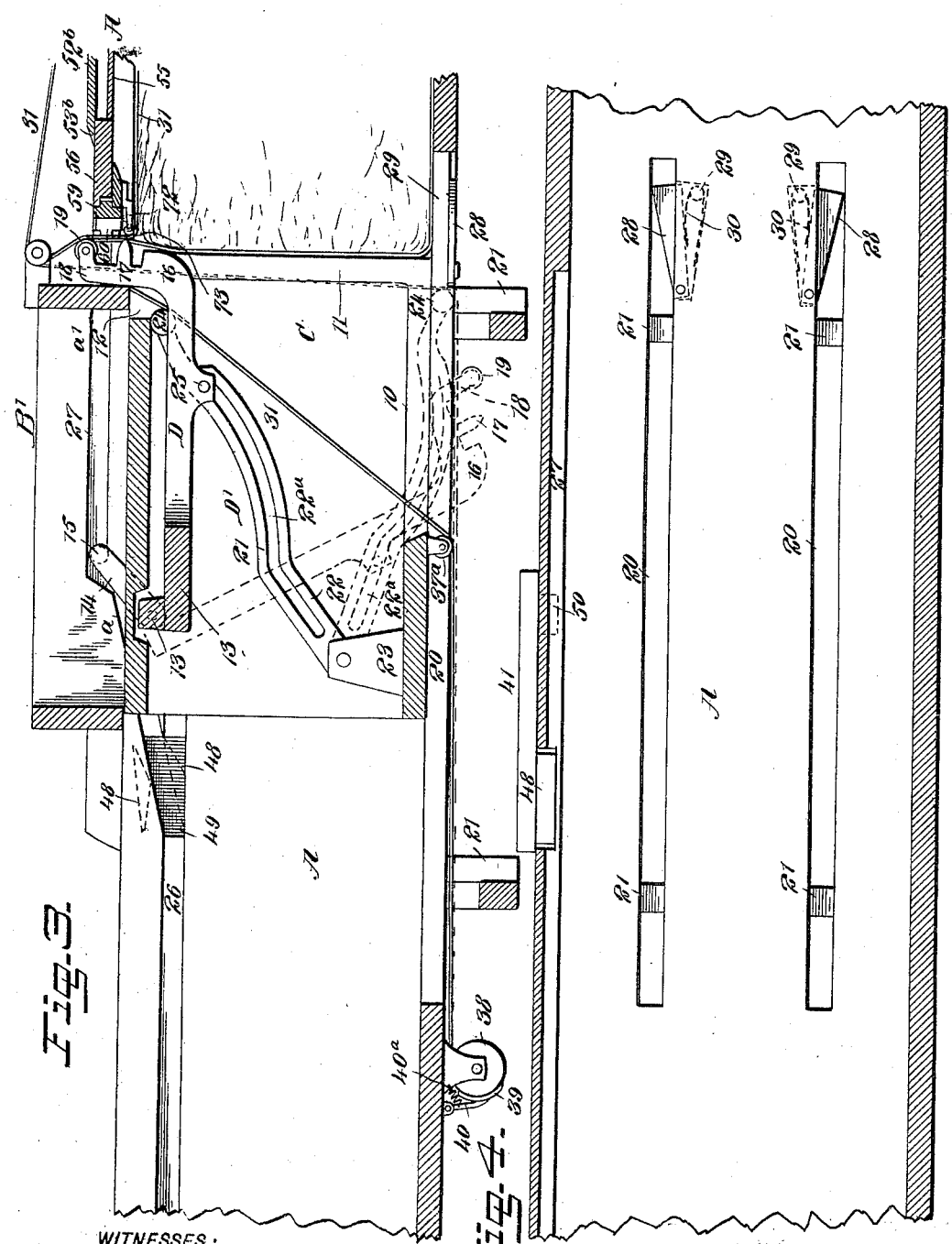
WITNESSES:
INVENTOR
Richard F. McKaig
BY
ATTORNEYS No. 689,111. Patented Dec. 17, 1901.
R. F. McKAIG.
HAY OR STRAW BALING MACHINE.
(Application filed June 1, 1901.)
(No Model.) 5 Sheets—Sheet 4.
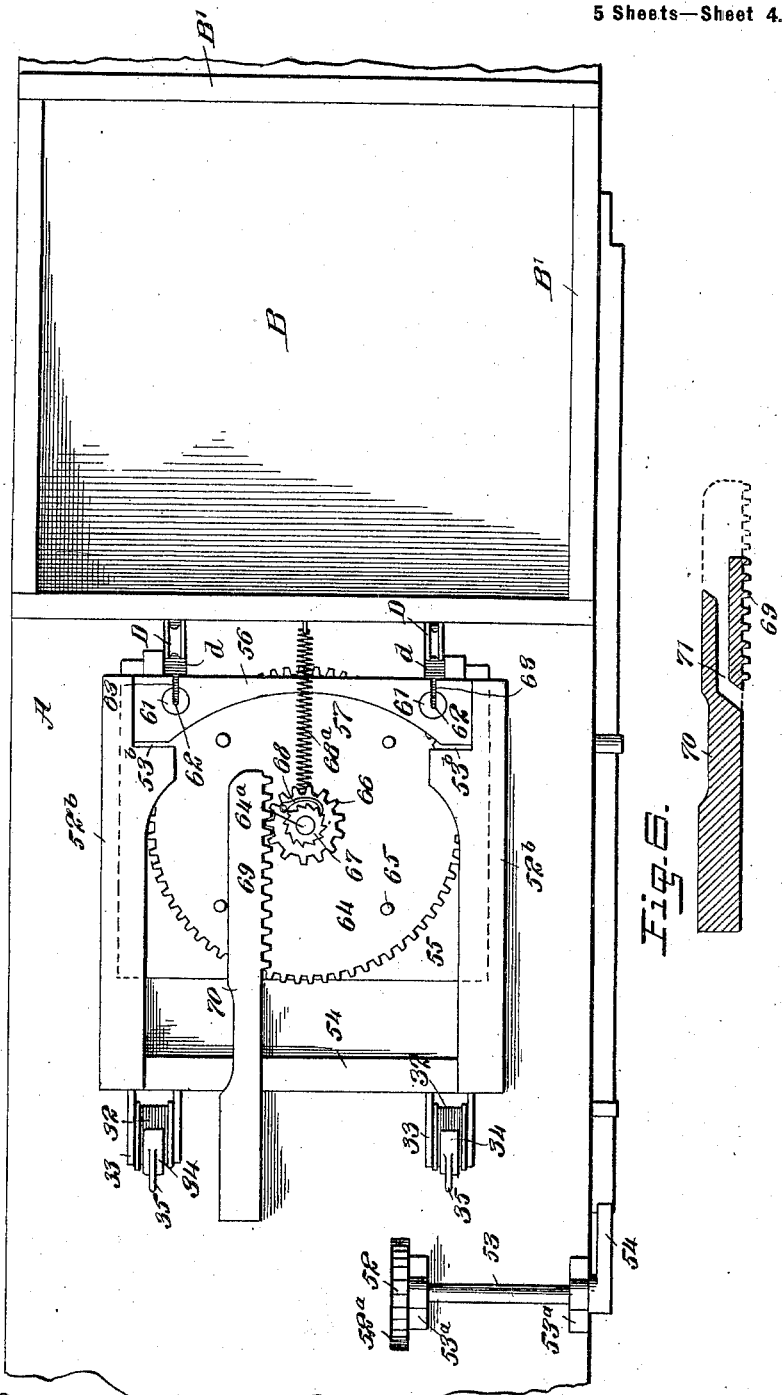
WITNESSES:
INVENTOR
Richard F. McKaig
BY
ATTORNEYS No. 689,111. Patented Dec. 17, 1901.
R. F. McKAIG.
HAY OR STRAW BALING MACHINE.
(Application filed June 1, 1901.)
(No Model.) 5 Sheets—Sheet 5.
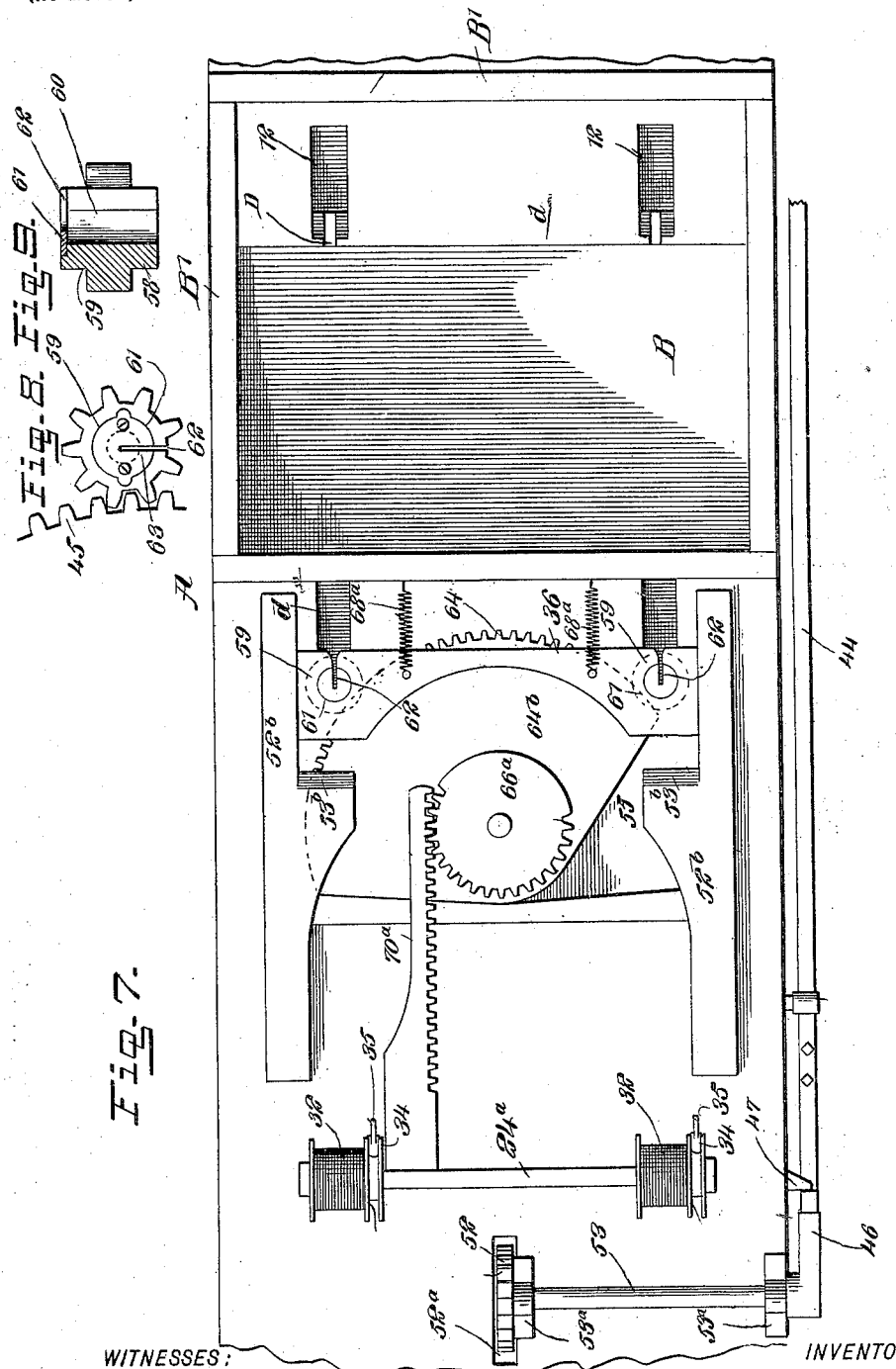
WITNESSES:
James P. Duhamel,
Fred Acker
INVENTOR
Richard F. McKaig
BY
ATTORNEYS

UNITED STATES PATENT OFFICE.

RICHARD FRANK McKAIG, OF WEVER, IOWA.

HAY OR STRAW BALING MACHINE.

SPECIFICATION forming part of Letters Patent No. 689,111, dated December 17, 1901.

Application filed June 1, 1901. Serial No. 62,684. (No model.)

*To all whom it may concern:*

Be it known that I, RICHARD FRANK MC-KAIG, a citizen of the United States, and a resident of Wever, in the county of Lee and State of Iowa, have invented a new and Improved Hay or Straw Baling Machine, of which the following is a full, clear, and exact description.

The purpose of the invention is to provide an automatic device for wiring bales of hay or straw in a press, particularly power and steam presses, and in connection with straw-presses adapted for attachment to threshing-machines, so that all the straw can be baled as it comes from the machine.

A further purpose of the invention is to provide a means for dispensing with the division or partition box usually employed, and, further, to provide means whereby as soon as a bale is completed the wiring device is thrown into gear, the bale is immediately wired, and the wire is twisted and cut at the twists therein and other wires laid for another bale.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
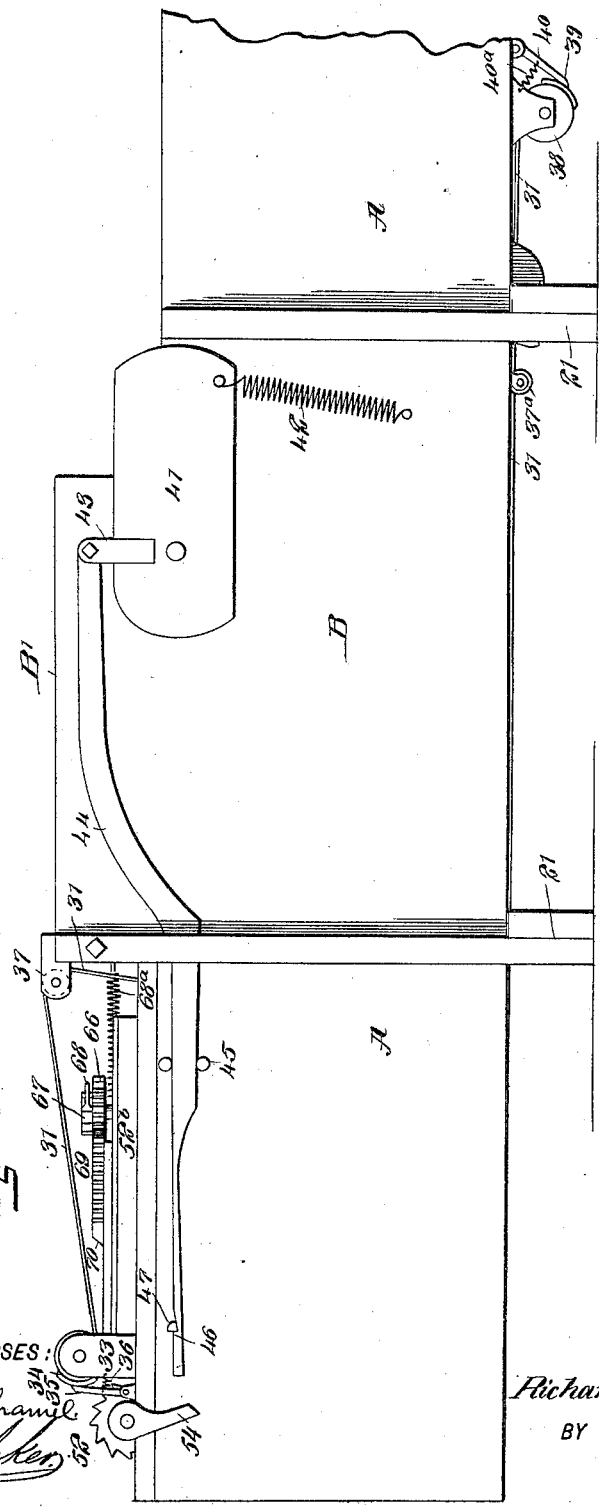
Figure 2:
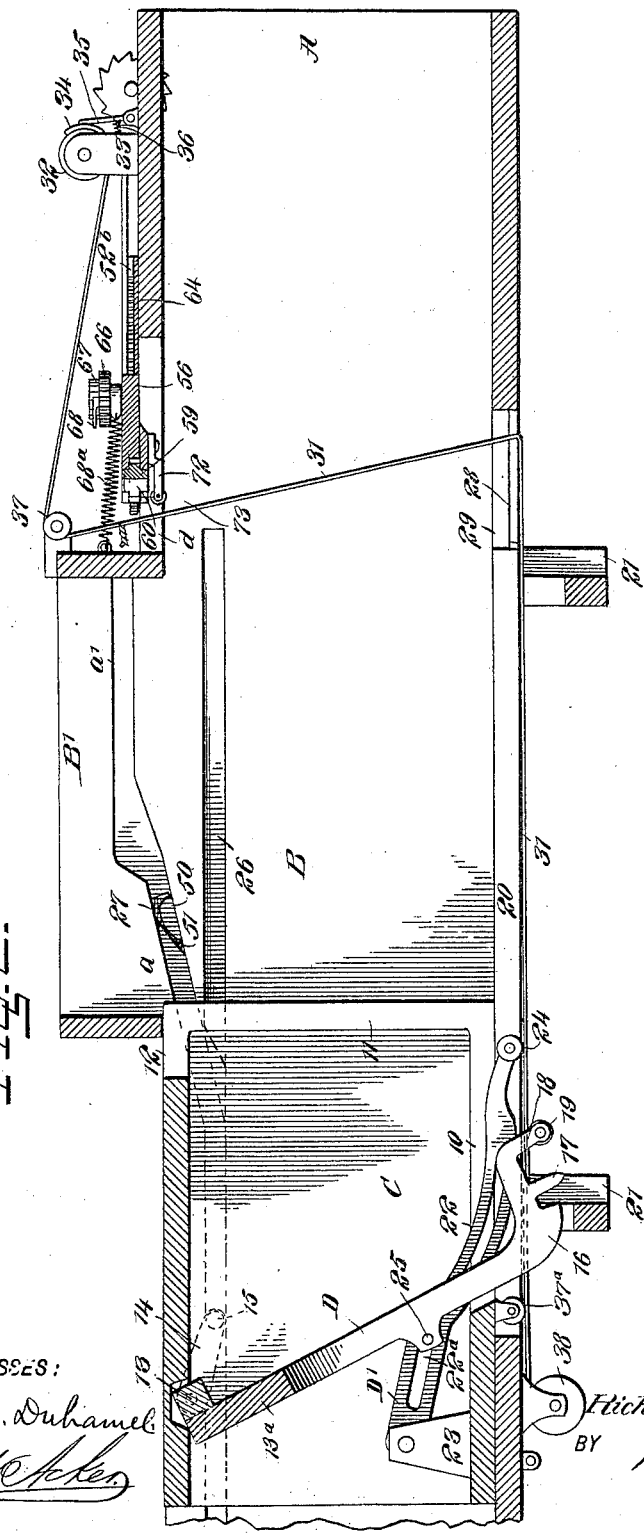

Figure 1 is a side elevation of a portion of a press to which the attachment is applied, showing the plate carrying the switch in its upper or normal position, which switch regulates the movement of the needles carried by the plunger or beater-head. Fig. 2 is a longitudinal vertical section through the press to which the attachment is applied, showing the parts in normal position and the wires laid to receive material for a bale. Fig. 3 is a partial vertical section through the press, showing the plunger or beater-head advanced in position to force a tied bale from the press, the needles being shown elevated and the wires about to be carried to the twisting mechanism. Fig. 4 is a horizontal section through a portion of the press, illustrating the construction of the bottom thereof. Fig. 5 is a plan view of a portion of the press. Fig. 6 is a horizontal section through the fixed rack employed in connection with the twisting mechanism. Fig. 7 is a plan view of a portion of the press, illustrating a slight modification in the arrangement of the twisting mechanism. Fig. 8 is a plan view of a twisting-pinion and a portion of the wheel for operating the same, and Fig. 9 is a vertical section through the twisting-pinion.

A represents the casing of a baling-press, B the baling-chamber of the press, and B' a hopper which is located at the upper portion of the baling-chamber. C represents a plunger or beater-head adapted to have movement in the frame or casing of the baling-press to and from the baling-chamber. This plunger or beater-head is practically closed at the top and at the bottom, and its sides may be entirely or partially open, if desired. The inner or forward end of the plunger or beater-head is practically closed, but its rear or outer end is open. The plunger or beater-head may be given movement in any approved manner. For example, it may be provided with a central partition at its inner portion, to which a pitman can be secured.

At the bottom of the inner portion of the plunger or beater-head two longitudinal slots 10 are produced, one at each side of the center, and these bottom slots 10 connect with vertical slots 11 in the inner end of the plunger or beater-head, the slots 11 being in communication with longitudinal openings 12 in the top of the plunger at its inner end. The openings 12 are parallel to and directly above the bottom slots 10 and are preferably of the same width; but the slots 11 where they pass through the inner face of the plunger need only be of sufficient width to accommodate the passage of baling-wires, to be hereinafter described.

Near the outer open end of the plunger a shaft 13 is journaled in suitable bearings secured to the upper face of the top of the plunger, and a crank-arm 14 is secured to one end of the shaft 13, being provided with a friction-roller 15 at its free extremity. A cross-bar 13ª, secured to the shaft 13, connects the two elements, which by preference I denominate needles D. Each of these needles comprises a shank and a head-section. Where the foot-section 16 of a needle connects with its shank, a transverse slot is produced for the passage of a baling-wire. The foot-section of each needle D is provided with a guide-spur 17 and a toe 18, both of which extend downward when a needle is inactive, as shown in Fig. 2, and when the needles are in such position their heads and lower portions of their shanks pass down through the slots 10 in the bottom of the plunger C and corresponding slots 20 in the bottom of the press-casing. The head 16 of each needle is provided with a longitudinal slot for a baling-wire, the slots being continuations of those in the bottom of the shanks, as shown in Fig. 2, and these slots extend through the fingers 18, in which fingers friction-rollers 19 are located, the baling-wires engaging with the top portions of the rollers 19, when they are passed through the feet of the needles. The casing is shown supported upon feet 21, slotted to permit the downward passage of the needles. When the needles are in their upper or working positions, their shanks are horizontally located beneath the top of the plunger, as shown in Fig. 3, and the feet 16 of the needles extend vertically up through the top openings 12 in the plunger and through registering openings $d$ in the top of the casing at the rear of the hopper B', as is shown in Fig. 3.

A guide-finger D' is provided for each needle. These guide-fingers have a double function, being adapted, in the first place, to lay the baling-wires straight at the bottom of the press to receive the material of the bale, and, second, to keep the baling-wires in proper position in the feet of the needles when they are operating in connection with the twisting mechanism, to be hereinafter described. These guide arms or fingers each consist of a curved body 22, having a longitudinal slot $22^a$ for a portion of its length, and the guide-arms are pivoted at their upper ends to projections 23 from the bottom outer portion of the plunger, the inner or free ends of the guide-arms D' carrying rollers 24 for engagement with the baling-wires. In their normal position the guide-arms have a downwardly and inwardly extending position, (shown in positive lines in Fig. 2 and in dotted lines in Fig. 3,) the rollers 24 being in the bottom slots 20 of the casing, and they bear upon the lower stretches of the baling-wires. When the needles D are in their working position, (shown in positive lines in Fig. 3,) the guide-arms are upwardly and forwardly inclined, as shown in the same figure. The guide-arms D' are compelled to move with the needles D by reason of pins 25 passing through the shanks of the needles into the slots $22^a$ of the guide-arms.

At that side of the casing near which the crank-arm 14 of the shaft 13 is located a horizontal track 26, which is in the nature of a groove, is produced in the inner face of the casing, extending from a point near its forward end across the baling-chamber to a point slightly beyond the rear of the said baling-chamber, as is shown in Fig. 2. A second track 27 is likewise provided in this side of the casing, and the track 27 meets the track 26 at an angle at a point slightly forward of the baling-chamber, as is also shown in Fig. 2. This inclined portion $a$ of the auxiliary track 27 meets a horizontal portion or section $a'$, which is above the main horizontal track 26, parallel therewith, and extends to the forward end of the hopper portion of the baling-chamber, as is also shown in Fig. 2.

At the rear end of each slot 20 in the bottom of the casing a recess 29 is produced in the under face of the bottom of the casing, and in each recess a latch-block 28 is pivoted. These latch-blocks are preferably of triangular shape and are held normally across the rear ends of the slots 20 by means of springs 30. The roller 15 of the crank-arm 14, connected with the needles, is adapted to travel on either of the two tracks 26 and 27. When the said roller travels on the lower or main track 26, which is horizontal throughout its length, the needles and guide-arms D and D' remain in the lower position, (shown in Fig. 2,) and as the plunger or beater-head C is moved rearward across the baling-chamber B the rollers 24 will press down the baling-wires, to be hereinafter described, as shown in Fig. 2 and in dotted lines in Fig. 3, and will carry the said wires down into the slots 20 in the bottom of the casing and cause the wires to engage with the rear ends of the latch-blocks 28, thus laying the lower strands of these wires straight and holding said strands in such position that the material fed to the baling-chamber will be piled thereon. The baling-wires 31 are carried from reels 32, located upon the upper portion of the rear part of the casing, which reels 32 are mounted to revolve in suitable standards 33. The wire on these reels is prevented from unwinding too freely by means of brakes 34, (shown in Fig. 2,) connected with shanks 35, pivoted to the top of the casing, and the brakes are held close to the wire by means of springs 36. The strands of wire are passed toward the front over guide-rollers 37, located at the upper rear portion of the hopper B', thence down through the openings $d$ in the top of the casing at the rear of the hopper, and forward in contact with guide-rollers $37^a$, attached to the bottom of the plunger or beater-head, which guide-rollers extend down into the slots 20, as is shown in Fig. 2. The other ends of the baling-wires are attached to reels 38, and these reels are mounted to turn in suitable bearings located upon the bottom forward portion of the casing, and the wire on these reels 38 is prevented from running off too freely by brakes 39, attached to shanks 40, pivoted to the bottom of the casing, and the brakes are held in position by means of springs $40^a$, as shown in Fig. 1.

At the outside of that portion of the casing in which the tracks 26 and 27 are produced a plate 41 is pivoted near its rear end upon the baling-section of the press. A spring 42 is attached to the lower forward portion of this pivoted plate 41 and to the outer face of the baling-section of the press, as is shown in Fig. 1. An upright 43 is carried from the upper edge of the pivoted plate 41 above its pivot-point, and a latch-arm 44 is pivotally attached to the said upright. This latch-arm is preferably provided with a straight rear and a curved forward section, and the latch-arm 44 at its rear portion passes between guides 45. (Also shown in Fig. 1.) The latch-arm terminates in a latch-head 46, adapted for locking engagement with a keeper 47, extending from the side of the rear portion of the press.

The plate 41 carries a switch 48, which extends into the casing of the press, as shown in Fig. 3, through an opening 49, produced in the side of the casing where the two tracks 26 and 27 connect. This switch is provided with a straight upper surface and a lower surface beveled from its ends in direction of its center. When the latch-arm 44 is locked to the keeper 47, the switch 48 is carried upward from the tracks 26 and 27, as is shown in dotted lines in Fig. 3; but when the latch-arm 44 is released from its keeper the spring 42, connected with the pivoted plate 41, will draw the said plate down and bring the switch 48 to the lower position, (shown in dotted lines in Fig. 3,) with its inclined surface against the lower edge of the main track 26, and the upper surface of the said switch will then extend from the bottom of the main track 26 to the lower portion of the upper or auxiliary track 27, and the roller 15 on the crank-arm 14 will then be compelled, as the plunger is moved forward, to travel up the switch and enter the upper track 27. When this action takes place, the needles are carried upward to the position shown in positive lines in Fig. 3, and their head portions will extend up through the openings $d$ in the upper rear part of the press-casing. A second projection 50 is produced upon the inner face of the pivoted plate 41. This projection extends through an opening 51 in the inclined section $a$ of the upper or auxiliary track 27, as is shown in Fig. 2, and the upper portion of this projection 50 is more or less curved or cam-shaped.

When the latch-arm 44 is in the locked position, (shown in Fig. 1,) it is not carried from this position unless a wired bale is being forced out at the rear portion of the press-casing, and during such operation the bale will come in engagement with a toothed wheel 52, which extends down into the casing through an opening $52^a$ on the top of the casing, as is shown in Fig. 5, and this toothed wheel is attached to a shaft 53, journaled in suitable bearings $53^a$ on the top of said casing, while at the outer end of this shaft 53 a crank-arm 54 is secured, and in the revolution of the wheel 52 consequent upon its frictional engagement with the outgoing bale the crank-arm 54 will be brought in engagement with the upper face of the latch-head 46 of the latch-arm 44 and will press the latch-head downward and release it from its keeper 47, whereupon the forward end of the pivoted plate 41 will be drawn downward and the latch-arm 44 will be carried in a forward direction and the switch 48 will be brought in position at the junction of the two tracks 26 and 27 and will conduct the roller 15 of the crank-arm 14 from the lower track 26 to the upper track 27, and thus bring the head portions of the needles to the upper position (shown in Fig. 3) at the time that the inner end of the plunger engages with the wired bale while the inner end of the said bale is just beyond the baling-chamber, and at this time the rollers 19, carried by the needles, will engage the meeting strands of wire at each side of the bale for the purpose of carrying the said strands to an adjusting mechanism, to be hereinafter described, and the guide-fingers D' will have been carried up and their rollers 24 will be in engagement with the upper portion of the wire strands, which extend down into the baling-chamber, the lower part of such portions of the strands being in engagement with the rollers $37^a$, carried by the plunger, and as these rollers are carried rearward by the corresponding movement of the plunger they will cause that portion of the wire strands within the baling-chamber to be engaged by the latch-blocks 28, placing the wire strands in position to receive material for another bale when the plunger is returned.

As the roller 15 on the crank-arm 14 travels up the inclined portion $a$ of the upper track 27 the said roller engages with the projection 50 from the pivoted plate 41 and forces the said projection downward, causing the forward end of the pivoted plate 41 to be raised, and consequently causing the latch-arm 44 to be carried rearward and its head 46 to again engage with the keeper 47, and in this manner the latch-arm is again placed in position to be tripped when another bale is being forced out and permits the plunger, if desired, to be carried forward with the roller 15 of the crank-arm 14 in the main or lower track 26, the needles D and guide-arms D' then being inactive and in their lower position.

With reference to the adjusting mechanism two guide-strips or guideways $52^b$ are located upon the upper face of the casing at the rear of the hopper B', the guideways being in parallel relation, and at the forward portion of each guideway a transversely-located knife $53^b$ is formed, as is particularly shown in Fig. 5. The guideways $52^b$ are connected at the rear by a cross-bar 54, and a plate 55 is mounted to slide in the ways $52^b$, as shown in Fig. 5. This plate is provided with a head-bar 56, the inner edge whereof is concaved, and the said head-bar has a horizontal opening between its upper and lower faces at points between its ends. The trunnions 58 of twisting pinions 59 are journaled in the head-bar 56 near each end. These pinions are opposite the openings $d$ in the casing and are provided with vertical slots 60, extending from the periphery inward to a point near the center, and ordinarily a steel plate 61 is secured to the top of each of the twisting-pinions 59, provided with a slot 62, corresponding to the slot 60 in the pinion to which it is applied; but the slot 62 in the plate 61, attached to the pinion, is quite narrow or is of such width that when two strands of wire which the pinions are adapted to receive are passed into the said slots 60 and 62 the slot 62 will prevent the wires from shifting their position, so that as the pinions 59 are turned the wires carried by the pinions will be twisted. Slots 63 are made in the front edge of the head-bar 56, which slots register with the slots in the pinions when the pinions are in position to receive the wires to be operated on.

A large gear 64 is mounted fast upon a stud $64^a$, journaled in the sliding plate 55, and the teeth of this gear mesh with the teeth of the pinions 59. The gear is provided with a series of upwardly-extending pins 65, and a pinion 66 is loosely mounted upon the stud $64^a$. A ratchet-wheel 67 is secured to the upper portion of the stud $64^a$ above the pinion 66, engaged by a pawl 68, pivoted upon the pinion 66, and a spring $68^a$ is attached to the stud $64^a$ and to the hopper, acting to draw the slide 55 and parts carried thereby in a forward direction. The teeth of the pinion 66 are in mesh with teeth 69 upon a rack-bar 70, secured to the cross-bar 54, as is shown in Fig. 6. This rack-bar is provided with a longitudinal slot 71, extending through its forward end and having a branch extending through the toothed edge of the bar. This slot is adapted at the return movement of the carriage on which the gear 64 is mounted to receive a pin 65 on the gear 64, and thus prevent the gear from turning during such movement while the ratchet works free.

In operation the baling-wires having been laid and the bale formed thereon the plunger is moved rearward, and as the completed bale leaves the baling-chamber the latch-arm 44 is released through the action of the toothed wheel 52 and the crank-arm 14 causing the switch 48 to drop, whereupon the crank-arm 14, connected with the needles, will enter and travel on the upper grooved track 27 as the plunger is carried rearward to push out the completed bale, and when such combination of movement occurs the needles D and their connected guide-arms D' are carried upward, and at the time the rear portion of the plunger has passed the baling-chamber the ends of the needles will have been carried upward, as described, through the openings d and the guide-spurs 17 and rollers 19 of the needles will be brought in engagement with the strands of the baling-wires, meeting at the front and top portions of the bale, as shown in Fig. 3. The strands of wire led through the baling-chamber pass over the rollers 19 in contact with the guide-rollers $37^a$ to the forward reels 38, and the strands in the baling-chamber are prevented from leaving the rollers 19 of the needles by the action of the rollers 24 upon them, carried by the guide-arms D'. The upper strands of the wire or those at the top of the bale are guided forward by rollers 73, carried by arms 72, secured to the bottom forward portion of the head-bar 56 of the twisting mechanism, as shown in Figs. 2 and 3. As the plunger is further moved rearward the double strands of the baling-wires extending above the bale are forced into the slots of the twisting-pinions, and the carrier for said pinions is pushed rearward by the needles against the tension of the spring $68^a$, causing the pinion 66 to be turned and through the pawl 68 communicate motion to the large gear 64 through the ratchet wheel and stud 67 and $64^a$. As the large gear 64 is turned motion is communicated to the twisting-pinions and the contacting wires are twisted. After the wires are twisted the further rearward movement of the carrying mechanism for the twisting-pinions causes the twisted portions of the wire to be brought in contact with the knives $53^b$, which cut the wires at or about the center of their twisted portions, leaving the wires on the bale fastened together and also leaving the wires connected which are to be again laid to receive another bale. As the large wheel 64 turns and when the twisting and cutting operations are completed, a pin 65 on the wheel 64 will enter the slot 71 in the rack 70, and the spring $68^a$ will then draw the carriage for the twisting mechanism forward to its normal position, the pinion 66 passing idly in engagement with the rack 70, as the pawl 68 does not act at such time. As the plunger is carried forward and as has been started, the roller 15 on the crank-arm 14 will engage with the offset 50 from the shifting plate 41 as such roller passes up the inclined portion of the upper grooved track 27 and the latch-arm 44 will be again locked and the switch will be carried to an upper position, permitting the roller of the crank-arm 14 at the return stroke of the plunger to travel from the upper track 27 into the forward portion of the lower track 26, thus causing the needles D and connected guide-arms D' to be brought to their lower or their normal position. This operation is repeated as each bale is discharged.

In Fig. 7 I have illustrated a slight modification in the operative mechanism for the twisting-carriage in which a toothed segment $64^b$ is employed to move the pinions 59, operated by a small gear $66^a$, connected therewith and engaging with teeth upon a stationary rack $70^a$, two springs $68^a$ being employed to exert forward tension upon the carriage. In this view I have also shown the reels for the wire as mounted upon a shaft $24^a$ and a slight deviation in the guides for the latch-arm 44.

Having thus described my invention, I claim as new and desire to secure by Letters Patent—

1. In baling-presses, a plunger or beater-head, and wire-manipulating needles carried by the plunger or beater-head, which needles are mounted to rock in the plunger, the heads of the needles having movement from a lower vertical position within the plunger to a position beyond the upper face of the plunger or beater-head, as specified.

2. In baling-presses, a plunger or beater-head, and wire-manipulating needles mounted to rock within the plunger or beater-head, and means for moving the needles by the movement of the plunger.

3. In baling-presses, a plunger or beater-head, wire-manipulating needles mounted to rock within the plunger or beater-head, guide-fingers for the baling-wires in operative connection with the needles, and means for moving the needles by the movement of the plunger, substantially as described.

4. In baling-presses, a plunger or beater-head, wire-manipulating needles carried by the plunger or beater-head and mounted to rock therein, the heads of the needles having movement from a lower vertical position within the plunger to a position beyond the upper face of the plunger or beater-head, means for supplying wire to the head-sections of the needles, and a wire-twisting device operated by the needles while in their upper position, substantially as described.

5. In baling-presses, a plunger or beater-head, wire-manipulating needles carried by the plunger or beater-head and mounted to rock therein, means for controlling the movement of the needles by the movement of the plunger in the press, the head-sections of the needles having movement from a lower vertical position within the plunger to a position beyond the upper face of the plunger or beater-head, devices for supplying wire to the head-sections of the needles, a wire-twisting device operated by the head-sections of the needles while in their upper position, and a knife arranged to cut the wires at their twisted portions, the said knife being stationary and the twisting device having rotary movement, and a sliding movement to and from the knife.

6. In baling-presses, a plunger or beater-head, wire-manipulating needles carried by the said plunger or beater-head and operated by the movement of the plunger, means for supplying wire to the needles, a slide mounted on the body of the press, operated by the needles when in one position, a gear carried by the said slide, wire-twisting pinions also carried by the said slide, the teeth of the pinions being in engagement with the gear, means for rotating the gear while the slide is in motion, and a knife which extends across the said slide, for the purpose set forth.

7. In a baling-press, the combination, with a press having a horizontal groove-track and an inclined branch groove-track intersecting the horizontal track, the branch groove-track extending upward, and being provided with an upper horizontal section, a switch located at the intersection of the two grooves, and a plunger having sliding movement in the said press, of a rock-shaft carried by said plunger, a crank-arm carried by the rock-shaft and provided with an extension adapted to travel in the said grooves, wire-manipulating needles attached to the said rock-shaft, the said needles being provided with head-sections at angles to their bodies, having guides over which wires are adapted to pass, means for supplying wires to the heads of the needles, means for laying the wires in the baling-chamber of the press, the said plunger being provided with openings in its top through which the foot-sections of the needles may pass and with slots in its working head through which the wires are passed, and means, substantially as described, for operating the said switch by the movement of the said plunger, as and for the purpose described.

8. In a baling-press, the combination, with a press having a horizontal groove and an inclined branch groove intersecting the horizontal groove, the branch groove extending upward, and being provided with an upper horizontal section, a switch located at the intersection of the two grooves, and a plunger having sliding movement in the said press, of a rock-shaft carried by the said plunger, a crank-arm carried by the rock-shaft and provided with an extension adapted to travel in the said grooves, wire-manipulating needles attached to the said rock-shaft, the said needles being provided with head-sections at angles to their bodies, having guides over which wires are adapted to pass, means for supplying wires to the head-sections of the needles, said plunger being provided with openings in its top through which the head-sections of the needles may pass, and with slots in its working head through which the wires are passed, means, substantially as described, for operating the said switch by the movement of the said plunger, a spring-controlled slide located at the upper portion of the press and adapted to be operated by the head-sections of the needles, a gear mounted on the said slide, a pinion loosely carried by the pivot of the gear, a ratchet secured to the pivot of the gear and a pawl carried by the pinion and engaging with the ratchet, a fixed rack adapted for engagement with the said pinion, slotted, wire-twisting pinions mounted in the said slide and operated by the said gear, and a knife held stationarily over the slide, for the purpose described.

9. In a baling-press, the combination, with the body of the press having a horizontal groove formed in one side and an inclined groove having a straight upper section, which inclined groove intersects the horizontal groove, a spring-controlled plate pivoted upon the outer face of the press, a projection from the plate extending into the inclined groove, and a switch attached to said pivoted plate, which extends likewise into the inclined groove near the point where said inclined groove connects with the horizontal groove, a latch-head, a connection between the latch-head and the pivoted plate, and a trip for the latch operated by the movement of a bale in the said press, of a plunger or beater-head held to slide in the press, having openings at its inner face intersecting vertical openings in said upper inner face, a rock-shaft mounted in the plunger, an arm attached to the rock-shaft and provided with an extension adapted to travel in the said grooves, wire-manipulating needles attached to the rock-shaft, said needles being provided with angular head-sections, and means for supplying and guiding the wire to the foot-sections of the needles, as described.

10. In a baling-press, a wire twisting and cutting device, consisting of a spring-controlled plate mounted to slide upon the press, means for operating the plate pinions adapted to receive wire, mounted to turn in the said plate, said pinions being provided with vertical slots reduced in width at their upper ends, a gear carried by the sliding plate, the teeth of said gear engaging with those of the pinions, a pinion loosely mounted on the gear, a ratchet-wheel secured to the gear, a pawl attached to the pinion and engaging the ratchet-wheel, a rack in engagement with the said gear, having a longitudinal slot, pins upon the gear, adapted to enter the slot, and a knife held stationarily over said sliding plate, for the purpose set forth.

In testimony whereof I have signed my name to this specification in the presence of two subscribing witnesses.

RICHARD FRANK McKAIG.

Witnesses:
H. D. McConn,
F. C. Biethan.